United States Patent
Lee et al.

(10) Patent No.: US 11,193,770 B2
(45) Date of Patent: Dec. 7, 2021

(54) MICROELECTROMECHANICAL SYSTEMS GYROSCOPE

(71) Applicant: SENSORTEK TECHNOLOGY CORP., Zhubei (TW)

(72) Inventors: Shih-Wei Lee, Zhubei (TW); Chao-Shiun Wang, Zhubei (TW)

(73) Assignee: Sensortek Technology Corp., Zhubei (TW)

( * ) Notice: Subject to any disclaimer, the term of this patent is extended or adjusted under 35 U.S.C. 154(b) by 0 days.

(21) Appl. No.: 17/016,870

(22) Filed: Sep. 10, 2020

(65) Prior Publication Data
US 2021/0088335 A1    Mar. 25, 2021

Related U.S. Application Data

(60) Provisional application No. 62/898,144, filed on Sep. 10, 2019.

(51) Int. Cl.
*G01C 19/5712* (2012.01)

(52) U.S. Cl.
CPC ................................ *G01C 19/5712* (2013.01)

(58) Field of Classification Search
CPC . G01C 19/5712; G01C 19/5762; G01C 19/02
See application file for complete search history.

(56) References Cited

U.S. PATENT DOCUMENTS

| | | | | |
|---|---|---|---|---|
| 5,083,466 A | * | 1/1992 | Holm-Kennedy | G01P 15/0802 73/514.33 |
| 6,076,401 A | * | 6/2000 | Okada | G01C 19/5712 73/504.12 |
| 6,122,961 A | * | 9/2000 | Geen | G01C 19/5719 73/504.12 |
| 6,367,326 B1 | * | 4/2002 | Okada | G01C 19/5712 73/504.12 |
| 6,481,283 B1 | * | 11/2002 | Cardarelli | G01C 19/5719 73/504.02 |
| 6,845,669 B2 | * | 1/2005 | Acar | B81B 3/0062 73/504.12 |
| 6,981,416 B2 | * | 1/2006 | Chen | G01P 15/125 73/510 |
| 7,100,446 B1 | * | 9/2006 | Acar | G01C 19/5719 73/504.12 |
| 7,205,867 B2 | * | 4/2007 | Lutz | H03H 9/02259 310/309 |
| 7,210,351 B2 | * | 5/2007 | Lo | G01P 15/125 73/510 |
| 8,104,364 B2 | * | 1/2012 | Chaumet | G01C 19/5762 74/5.46 |

(Continued)

*Primary Examiner* — David J Bolduc
(74) *Attorney, Agent, or Firm* — Rosenberg, Klein & Lee

(57) ABSTRACT

The invention related to a microelectromechanical systems gyroscope, which comprises a plurality of sensing modules sensing angular velocities on tri-axes, a plurality of outer frames set at outside of the sensing modules, and a plurality of driving shafts set between the frames respectively. The driving shafts are connected with two adjacent frames by first and second flexible connecting elements, respectively, and the frames are connected with the sensing modules by a plurality of transporting units. Thus, tri-axes sensing is provided.

12 Claims, 7 Drawing Sheets

(56) References Cited

U.S. PATENT DOCUMENTS

| | | | | |
|---|---|---|---|---|
| 8,113,050 B2* | 2/2012 | Acar | ................. | G01P 15/18 |
| | | | | 73/504.04 |
| 8,322,213 B2* | 12/2012 | Trusov | ............... | G01C 19/5719 |
| | | | | 73/504.12 |
| 10,823,569 B1* | 11/2020 | Shao | ................... | G01C 19/5656 |
| 2009/0260437 A1* | 10/2009 | Blomqvist | ......... | G01C 19/5762 |
| | | | | 73/504.12 |
| 2010/0122576 A1* | 5/2010 | Classen | .............. | G01C 19/5755 |
| | | | | 73/504.12 |
| 2010/0263446 A1* | 10/2010 | Tamura | ............... | G01C 19/5712 |
| | | | | 73/504.12 |
| 2011/0030473 A1* | 2/2011 | Acar | ..................... | G01P 15/125 |
| | | | | 73/504.12 |
| 2011/0061460 A1* | 3/2011 | Seeger | ............... | G01C 19/5712 |
| | | | | 73/504.12 |
| 2011/0270569 A1* | 11/2011 | Stephanou | .............. | H01L 41/25 |
| | | | | 702/141 |
| 2013/0180332 A1* | 7/2013 | Jia | ...................... | G01C 19/5762 |
| | | | | 73/504.12 |
| 2013/0263664 A1* | 10/2013 | Kanemoto | ......... | G01C 19/5747 |
| | | | | 73/504.12 |
| 2015/0377624 A1* | 12/2015 | Falorni | .............. | G01C 19/5712 |
| | | | | 73/504.12 |
| 2016/0130133 A1* | 5/2016 | Boillot | ................. | B81B 3/0048 |
| | | | | 73/504.12 |
| 2016/0231115 A1* | 8/2016 | Piirainen | ............ | G01C 19/5747 |
| 2016/0231116 A1* | 8/2016 | Piirainen | ............ | G01C 19/5712 |
| 2016/0334215 A1* | 11/2016 | Kato | ................... | G01C 19/5747 |
| 2018/0031602 A1* | 2/2018 | Huang | .................. | G01P 15/125 |
| 2019/0078887 A1* | 3/2019 | Bode | ................. | G01C 19/5762 |
| 2020/0096337 A1* | 3/2020 | Senkal | ................ | G01C 19/5712 |
| 2020/0124418 A1* | 4/2020 | Blomqvist | ......... | G01C 19/5712 |
| 2020/0263990 A1* | 8/2020 | Kuisma | .............. | G01C 19/5712 |

* cited by examiner

MICROELECTROMECHANICAL SYSTEMS GYROSCOPE

FIELD OF THE INVENTION

The present application refers to a gyroscope, particularly a micro-electromechanical systems gyroscope with the function of testing three-axis angular speeds.

BACKGROUND OF THE INVENTION

The microelectromechanical systems (mems) gyroscope is usually applied to measure the spinning movement of a system on each axis of the x-y-z coordinate. When a mass moves linearly along an axis and bears an angular velocity, the mass block may sense a Coriolis force. The force drives the mass block to generate displacement in a direction perpendicular to the an axial direction of the axis, and sense the angular velocity of the mass block. Yet, the mass block may not sense the spins parallel to the axial direction of the axis. Therefore, if an operator tends to sense the three-axis angular velocities, at least two sets of mass blocks moving in different directions are required. However, the issue of driving masses in a tiny micro-electromechanical structure to move in different directions and in stable state while also controlling the cost of the microelectromechanical gyroscope within a reasonable range, avoiding noise and non-ideal signals from affecting the sensing results has become a problem for each vendor.

Based on the aforesaid issue, the present application provides a microelectromechanical system gyroscope, which uses the outer frame to couple the external forces taken by the microelectromechanical system gyroscope in the prospective of upgrading the accuracy of three-axis measurement and solve the aforesaid problems.

SUMMARY

The purpose of the present application is to provide a microelectromechanical system gyroscope, by setting plural drive shafts between plural outer frames, the driving shafts are connected to all the outer frames through flexible connecting elements, and the outer frames are connected to plural sensing modules through plural transmission pieces; thus, all outer frames are connected to the driving shafts by the flexible connecting elements to connect the external force provided by the drive shafts.

The present application discloses a microelectromechanical system gyroscope, which includes plural sensing modules used to sense angular velocities in three axial directions; plural outer frames are disposed on the outside of the sensing modules; plural driving devices connect to the sensing modules; plural driving shafts are disposed among the outer frames that connect to two adjacent outer frames through a first flexible connecting element and a second flexible connecting element. In this way, among all outer frames, the first flexible connecting element and the second flexible connecting element are coupled with the external forces provided by the driving shafts, and thereby, the accuracy of the three-axis measurement may be improved.

DETAILED DESCRIPTION

In order to enable the review committee members to have a further understanding of the characteristics of the present application and the effects it achieves, the embodiments and accompanying descriptions are provided here, stated in below:

Some terms have used in the invention description and claims to specify certain devices; yet, anyone in the field of the present application with common knowledge shall be able to understand these terms; manufacturers may use different terms to call the same device, and the present application description and claims do not use the difference in terms as the criterion of distinction, instead, the present application description and claims use the difference in overall technology as the criterion. The "include", "have" or "disposed with" mentioned in the entire invention description and claims is an open term, which shall be explained as "include but not limited to". Moreover, the "coupled" stated herein includes the direct connection and indirect connection. Therefore, if there is an expression of "a primary device is coupled to the secondary device", it means that the primary device is coupled to the secondary device directly or via the other device or another connection way indirectly.

Figure 1:
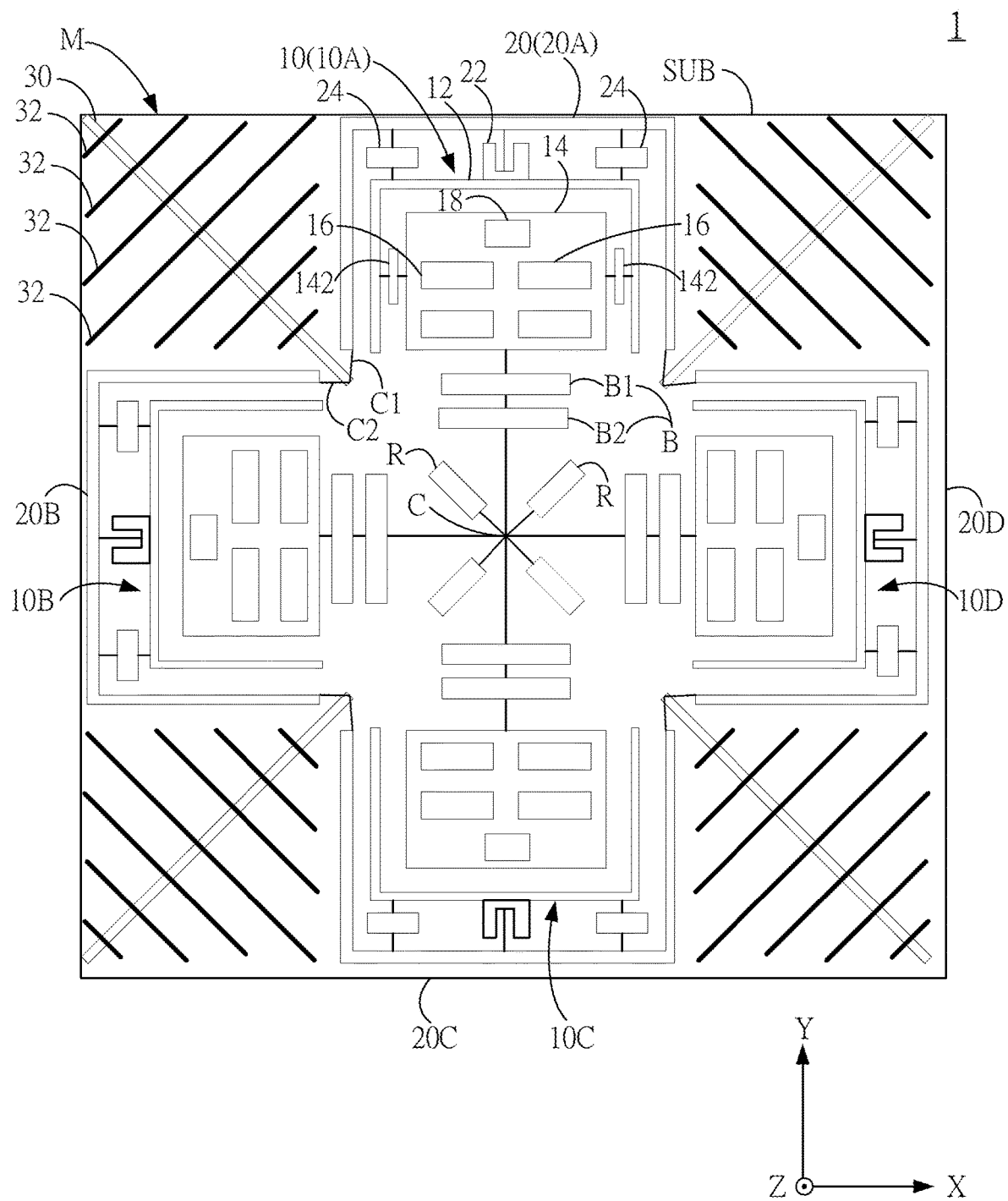
FIG. 1: which is a configuration schematic diagram of the microelectromechanical system gyroscope in one embodiment of the present application.

In the below statement, applicant further disclose the characteristics and configuration of a microelectromechanical system gyroscope disclosed in the present application:

First, referring to FIG. 1, which is the configuration schematic diagram of a microelectromechanical system gyroscope in one embodiment of the present application. As shown in the figure, the microelectromechanical system gyroscope 1 of the present application include a plurality of sensing modules 10, outer frames 20 and driving shafts 30; the sensing modules 10 each has a mass block, and is used to sense the angular velocity in three axes, that is, the X-axis, Y-axis and Z-axis angular velocities; the outer frames 20 are disposed outside of the sensing modules 10, and coupled to the sensing modules 10 through a plurality of driving devices 22; the driving shafts 30 are disposed between the outer frames 20, and the driving shafts 30 each is connected to two adjacent outer frames in the outer frames 20 through a first flexible connecting element C1 and a second flexible connecting element C2 each.

As stated above, to sense the angular velocities of three axes, it at least shall provide two sets of mass blocks moving along two different directions; since the present application's embodiment at least equips the first sensing module 10A and second sensing module 10B, and the mass blocks of first sensing module 10A and second sensing module 10B are, in respective, driven to make linear movement along Y-axis and X-axis. Normally, the microelectromechanical system gyroscope will form a symmetrical structure, therefore, the invention embodiment is better disposed with the third sensing module 10C and fourth sensing module 10D, in which the mass blocks of third sensing module 10C and first sensing module 10A are driven to linearly move along Y-axis, and the mass blocks of fourth sensing module 10D and second sensing module 10B are driven to linearly move along X-axis too. The outer frame 20A, 20B, 20C and 20D are disposed at outside of first to fourth sensing module 10A, 10B, 10C and 10D. Four driving shaft 30 are disposed between the outer frames 20A, 20B, 20C and 20D, and connected to the outer frames 20A. 20B, 20C and 20D each through the first flexible connecting element C1 and second flexible connecting element C2. In this way, all of the outer frames 20 may be connected together through the first flexible connecting element C1 and second flexible connecting element C2 in four driving shafts 30, which are used for coupling to the driving forces granted from driving shaft 30 and other external forces taken by the microelectromechanical system gyroscope 1.

Further, referring to FIG. 1, each of the sensing modules 10 includes a driving structure 12, a mass block 14, at least one first sensing unit 16 and at least one second sensing unit 18; in this embodiment, a frame shaped structure is token as the example of the driving structure 12 as the following description, yet, the driving structure 12 of the application isn't limited to the frame structure. The driving structure 12 connects the corresponded outer frame 20 through a driving device 22. In the following, for interpreting on the first sensing module 10A, whereas the other sensing module 10B, 10C and 10D have the similar structure, only the directional configuration is different and the respective interpretation is neglected. The mass block 14 in first sensing module 10A needs to be driven to move linearly along the Y-axis, and the mass block 14 is driven by outer frame 20A through driving structure 12 to linearly move along Y-axis; yet, in order to let the outer frame 20 and the driving structure 12 be able to drive the mass block 14 along Y-axis effectively, in this embodiment, it mainly use one driving device 22 connected with the driving structure 12 and outer frame 20A in first sensing module 10A; the driving device 22 has better rigidity in Y-axis (parallel to the connecting direction of outer frame 20A and driving structure 12), and the driving device 22 is flexible in X-axis and Z-axis directions perpendicular to Y-axis (perpendicular to the connecting direction of outer frame 20A and driving structure 12), therefore, when the outer frame 20A exerts force to the driving structure 12 along Y-axis, it may effectively drive the mass block 14 along Y-axis through the driving structure 12; yet, if the outer frame 20A forms non-ideal displacements on X-axis or Z-axis, the driving device 22 will relax and absorb the non-ideal displacements, avoid the outer frame 20A from exerting force to the driving structure 12 along X-axis and Z-axis. The aforesaid driving device 22 that has better rigidity in Y-axis yet is flexible on the plane perpendicular to Y-axis may be formed by several structures, such as the driving device 22 in FIG. 1 that includes a few long and straight structure extended along Y-axis, which makes it have better rigidity in Y-axis direction; since these long and straight structures are connected into a 3-D structure by a few bent parts, it is flexible on the plane perpendicular to Y-axis. Or, the driving device 22 built by using hard and straight material associated with thinner buffer in Y-axis direction also may drive with a similar effect; it isn't limited in the present application.

The better connection of the driving device 22 is to connect to the center of the driving device 22; besides, in the position between outer frame 20 and driving structure 12, at least one restraint element 24 is further set, and the restraint element 24 may be disposed outside the driving device 22, and at least one restraint element 24 connects the outer frame 20 and driving structure 12. In the following statement, applicant still interpret on the first sensing module 10A, the at least one restraint element 24 are flexible in Y-axis direction, and has better rigidity in both x- and Z-axis directions. From this fact, equip the extra restraint element 24 to connect driving structure 12 of first sensing module 10A and outer frame 20A, which allows the driving structure 12 and outer frame 20A form relative displacement in Y-axis direction, yet will restrict the driving structure 12 and outer frame 20A making relative displacement in X- or Z-axis direction, which may eliminate the external force taken by outer frame 20A. In the case that if the driving shaft 30 pair at both sides of outer frame 20A exert uneven forces or the strokes are not simultaneously, or if the outer frame 20A takes unexpected external force, it is possible making the outer frame 20A take improper external force in X-axis or Z-axis direction, the driving device 22 works with at least one restraint element 24 to more effectively relax and absorb the non-ideal displacement of outer frame 20A in X- or Z-axis direction. The at least restraint element 24 that is flexible in Y-axis direction and has better rigidity in the plane perpendicular to Y-axis may be built by several structures, for example, equip a fixed supporting point at outer frame 20 and driving structure 12, using a flexible device to connect outer frame 20 and the fixed supporting point, and use the other flexible device to connect the driving structure 12 and the fixed supporting point, in the present application, the detailed structure of the at least one restraint element should not be restricted.

Referring to FIG. 1, the mass block 14 connects the driving structure 12 through at least one flexible connecting element 142, for example, it has one flexible connecting element 142 connecting to driving structure 12 at each side of it, which makes mass block 14 generate displacement relative to driving structure 12. In the following statement, applicant still make an interpretation on first sensing module 10A; normally speaking, the flexible connecting element 142 shall make the mass block 14 of first sensing module 10A generate displacement relative to driving structure 12 in x- and Z-axis direction; yet, in order to make driving structure 12 able to drive mass block 14 in Y-axis efficiently, it is better to restrict the flexible connecting element 142 in the way the mass block 14 may not make displacement relative to driving structure 12 in Y-axis. The first sensing unit 16 and second sensing unit 18 are disposed on mass block 14, which may include the inducing coil, electrode or other displacement-sensing devices to detect external forces in different axis system; for example: X-axis and Z-axis (first sensing module 10A, third sensing module 10C) or Y-axis and Z-axis (second sensing module 10B fourth sensing module 10D). Further, the sensing module 10 connects a fixed point c located at the relative center of the sensing modules, the fixing point c connects plural spinning restraint element r relative to the plural driving shaft 30; there is a connector b disposed between the fixing point c and plural sensing module 10, the sensing module 10 connects point c through connector b, providing a buffer space to let the first to fourth sensing module 10A, 10B, 10C and 10D able to be driven and move relative to point c; in this embodiment, connector b takes the example of including flexible buffer B1 and B2, to interpret about, yet, it also may use other structure of connector b according to design requirements. The spinning restraint element r comprises a fixed supporting point and flexible devices, used to avoid the sensing module 10 from spinning relative to the fixed point C.

Figure 2:
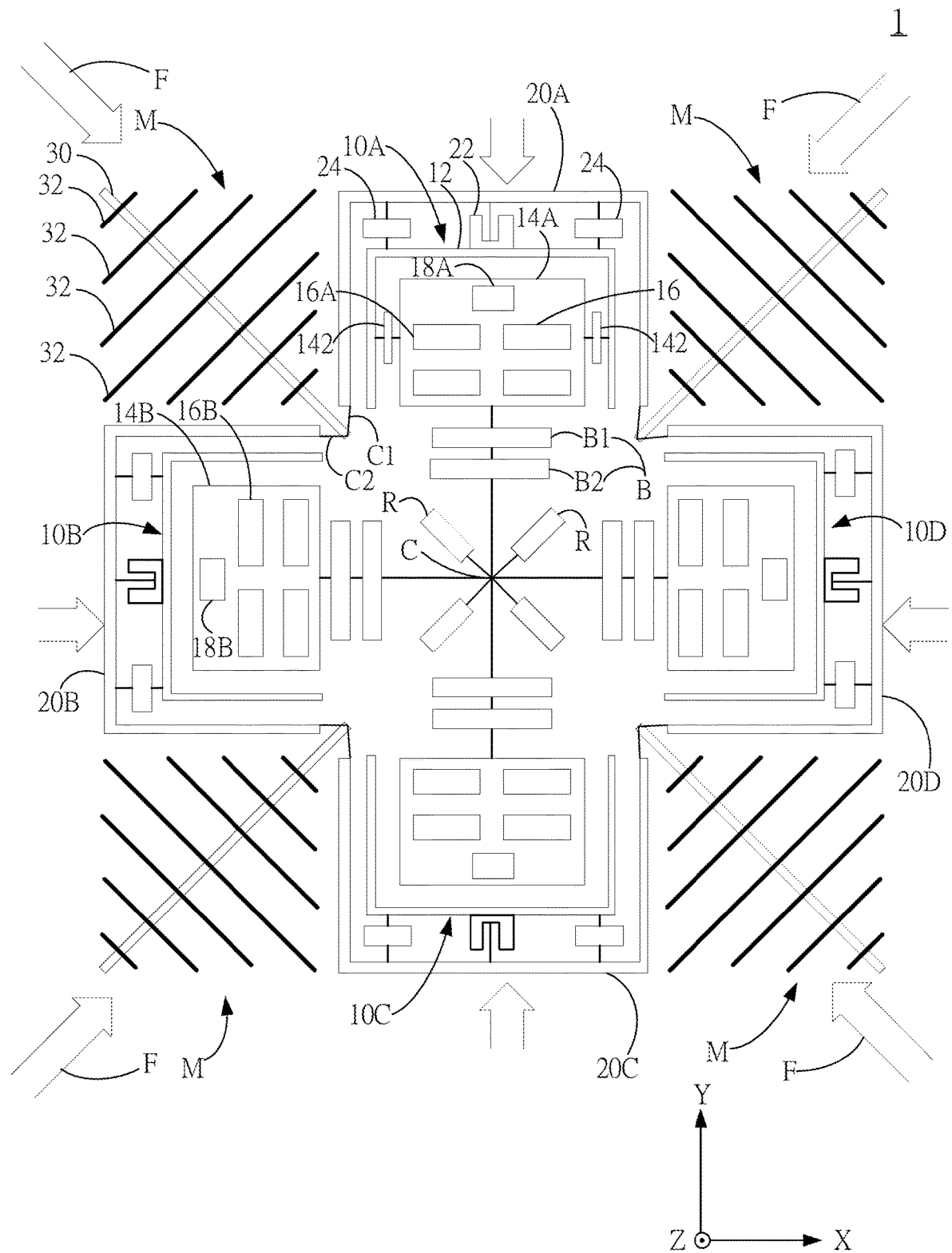
FIG. 2: which is an action schematic diagram of the microelectromechanical system gyroscope in one embodiment of the present application.

In a more specific way, referring to FIG. 2, the sensing module of this embodiment includes the first sensing module 10A and second sensing module 10B. Both the first sensing module 10A and the second sensing module 10B are sensing the angular velocity of the Z-axis the is perpendicular to the picture, it also respectively senses the angular velocities of different axes (i.e., X-axis and Y-axis) horizontal to the picture, wherein the first sensing unit 16A of the first sensing module 10A senses the displacement of mass block 14A in the Z-axis; when mass block 14A is driven along Y-axis and bears the angular velocity of X-axis, it will form displacement and let first sensing unit 16A sense the angular velocity in X-axis. For these X-axis displacements of mass block 14A sensed by the second sensing unit 18A of first sensing module 10A, when mass block 14A is driven along Y-axis and bears the angular velocity in Z-axis, it will form the displacement; therefore, the second sensing unit 18A may sense the angular velocity in Z-axis; for these X-axis displacements of mass block 14A sensed by the second sensing unit 18A of first sensing module 10A, when mass block 14A is driven along Y-axis and bears the angular velocity in Z-axis, it will form the displacement; therefore, the second sensing unit 18A may sense the angular velocity in Z-axis; for these Z-axis displacements of mass block 14B sensed by the first sensing unit 16B of second sensing module 10B, when mass block 14B is driven along X-axis and bears the angular velocity in Y-axis, it will form the displacement; therefore, the first sensing unit 16B may sense the angular velocity in Y-axis. For these Y-axis displacements of mass block 14B sensed by the second sensing unit 18A of first sensing module 10A, when mass block 14B is driven along X-axis and bears the angular velocity in Z-axis, it will form the displacement; therefore, the second sensing unit 18b may sense the angular velocity in Z-axis.

In this embodiment, driving shaft 30 may be driven by the driving unit m made by comb unit 32 in the way that the comb unit 32 drives driving shaft 30 to push inward and exert external f, the driving shaft 30 transmits the force to adjacent outer frame 20A, 20B through first flexible connecting element C1 and second flexible connecting element C2, and thus transmits the force component to first sensing module 10A and second sensing module 10B through the driving device 22; in this embodiment, outer frame 20A and 20B simultaneously take force from driving shaft 30 to squeeze inward; they also may simultaneously expand outward and form reciprocated movement. When the driving shaft 30 at the up-left corner of the drawing pushes inward, through the first flexible connecting element C1, it may drive the mass block 14A of first sensing unit 16A to move along Y-axis toward the fixed point c; although driving shaft 30 also will drive outer frame 20A along X-axis, but the driving shaft 30 at the right-left corner of the drawing also will simultaneously drive outer frame 20A along X-axis to offset the external force in X-axis, therefore, mass block 14A will not be affected by driving shaft 30 making improper displacement in X-axis direction. On the contrary, when driving shaft 30 expands outward, it will drive mass block 14A moving away from the fixed point C along Y-axis. Therefore, by the repeated action of driving shaft 30, mass block MA of first sensing unit 16A makes reciprocating movement along Y-axis, making the mass block 14B of the second sensing unit 16B perform reciprocating movement along X-axis.

In this embodiment, microelectromechanical system gyroscope may form symmetrical structure; the above statement has described the movements of first sensing module 10A, second sensing module 10B and respective outer frame 20A, 20B, applicant thus will not repeat the same description on the movements of third sensing module 10C, fourth sensing module 10D and the respective outer frame 20C, 20D.

In this embodiment, microelectromechanical system gyroscope drives sensing module 10 by means of driving shaft 30 disposed between outer frame 20 through outer frame 20; compared with the conventional technology, sensing module 10 is driven directly, which has the following important effects: the design letting driving shaft 30 to drive, outer frame 20 to transmit force and sensing module 10 to simply perform sensing greatly reduces the design difficulty of this embodiment and makes cost easy to be controlled. Moreover, since the present application additionally equips the outer frame 20, all of the outer frames 20 are formed a connection to the flexible connecting elements C1, C2 via the flexible connecting elements C1, C2 on driving shaft 30; therefore, improper external forces taken by any of the outer frames 20 may be coupled, absorbed and balanced by means of the buffer structure, and easily eliminated through the back-end circuit; besides, since the sensing modules 10 are not directly driven by the driving shaft 30, and driven through the transmission of the outer frames 10; in this embodiment, the aforesaid driving device 22 or restraint element 24 may be set between outer frame 20 and sensing module 10 to effectively relax and absorb non-ideal displacement in outer frame 2, which makes the microelectromechanical system gyroscope 1 in this embodiment have the advantages of lower noise and higher accuracy.

Figure 3:
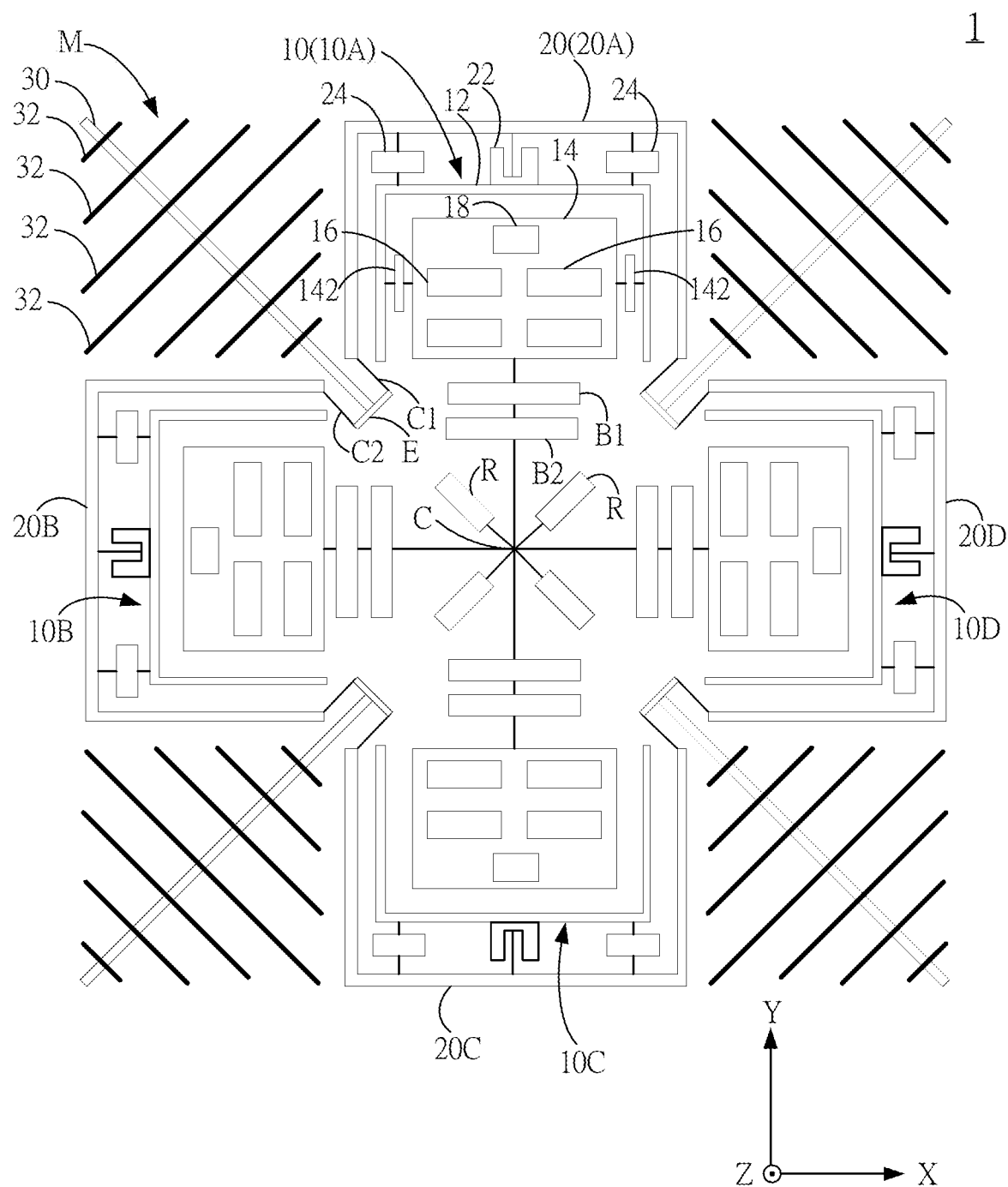
FIG. 3: which is a configuration schematic diagram of the microelectromechanical system gyroscope in another embodiment of the present application.

As shown in FIG. 3, it is the configuration schematic diagram of a microelectromechanical system gyroscope in another embodiment of the present application. Compared to the aforesaid case that the driving shaft 30 is directly connected to the outer frame 20 through the first flexible connecting element C1 and the second flexible connecting element C2, the present application also may form an extending part E at a front tip of the driving shaft 30; this extending part E extends to exceed the adjacent outer frame 20 at both sides, have the extending part E connects first flexible connecting element C1 and second flexible connecting element C2 to connect the two outer frame 20 at both sides, which may upgrade the moving space of driving shaft 30 and ready to equip larger flexible connecting element, effectively increases the moving amplitude of first flexible connecting element C1 and second flexible connecting element C2. According to the aforesaid features, under the circumstance of not changing the displacement spacing of driving shaft 30, in this embodiment, the mass block 14 of the sensing module 10 is driven to move larger displacement.

Figure 4:
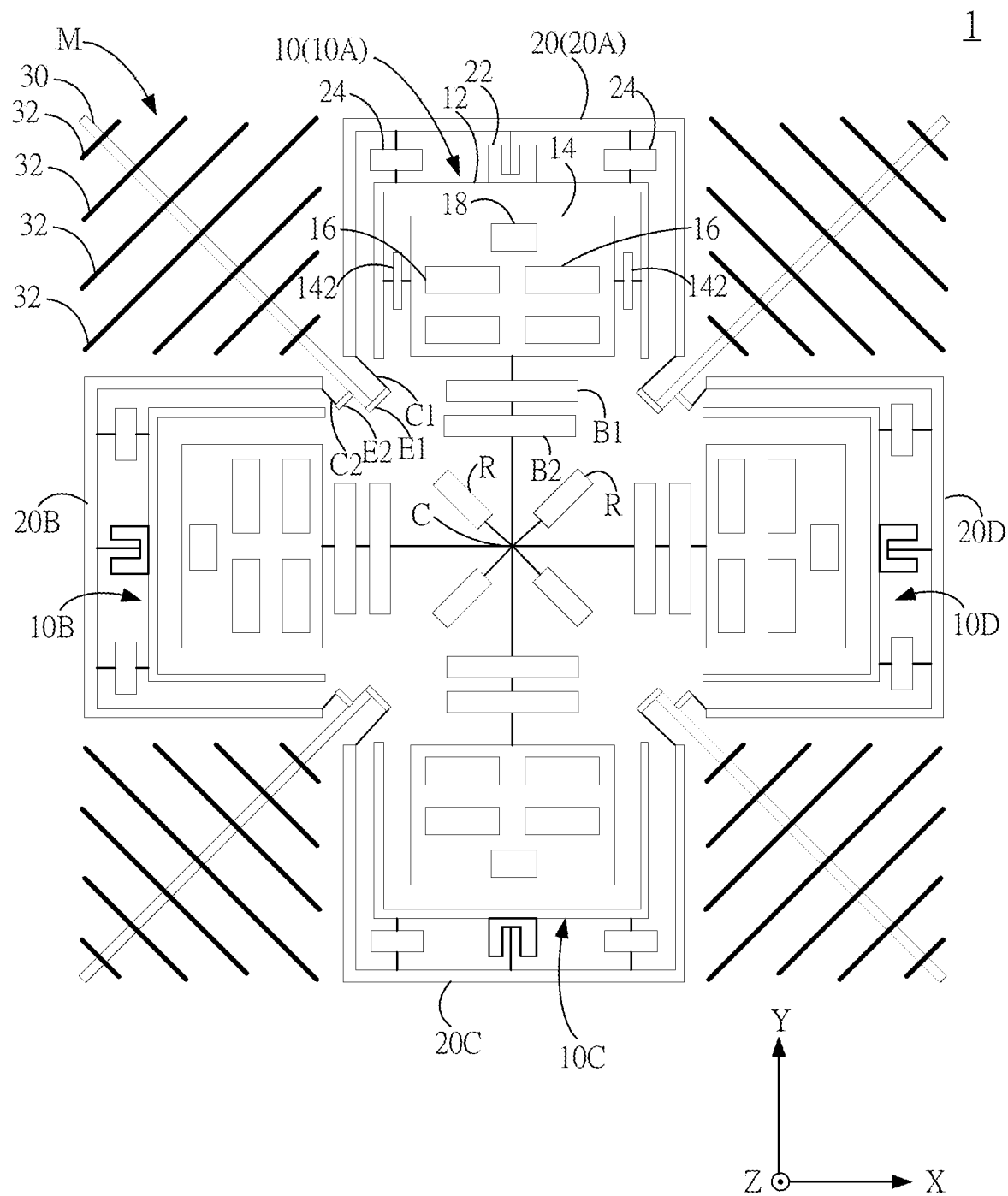
FIG. 4: which is a configuration schematic diagram of the microelectromechanical system gyroscope in another embodiment of the present application.
Figure 5:
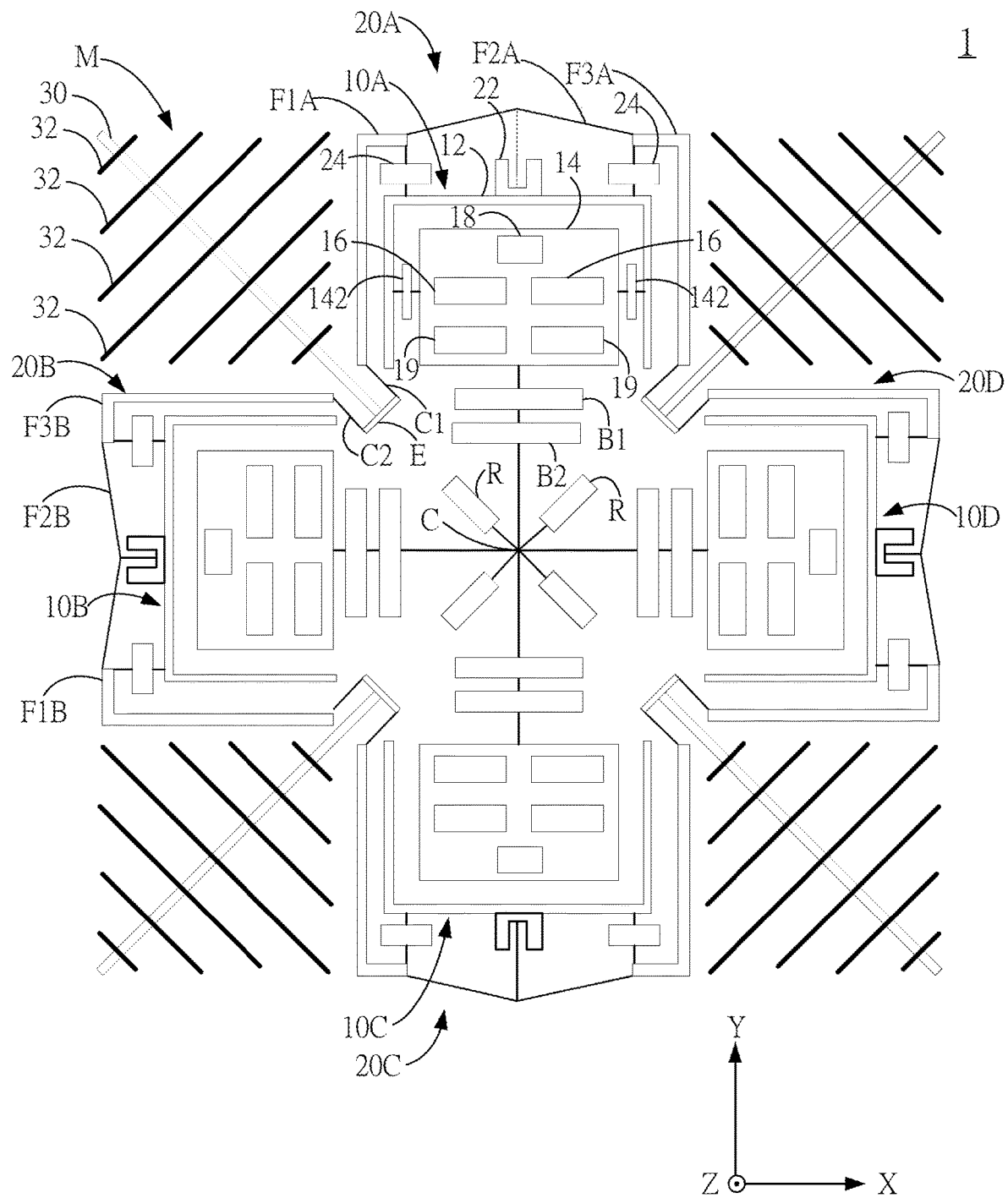
FIG. 5: which is a configuration schematic diagram of the microelectromechanical system gyroscope in another embodiment of the present application.

As shown in FIG. 4, it is the configuration schematic diagram of a microelectromechanical system gyroscope in another embodiment of the present application. This embodiment may extend a first extending part E1 and a second extending part E2 from the different end of driving shaft 30; where the distance between the first extending part E1 and outer frame 20 at that side shall differ from the distance between the second extending part E2 and outer frame 20 at the same side. From this aspect, the length of the first flexible connecting element C1 connected by first extending part E1 shall differ from the length of the second flexible connecting element C2 connected by second extending part E2, therefore, they have different moving spacing; even a first extending part E1 and a second extending part E2 are driven by same driving shaft 30, this embodiment may drive the two frame 20 at both sides of outer to create different corresponding displacement spacing of sensing module 10 to increase the design flexibility of the present application.

referring to FIG. 5; it is the configuration schematic diagram of a microelectromechanical system gyroscope in another embodiment of the present application. The difference between this figure and aforesaid other embodiments is: the present application may change partial structure of outer frame 20 into flexible structure. For example, first outer frame 20A, which is disposed outside of first sensing module 10A includes a first side frame F1A, an enlarging frame F2A and a second side frame F3A; one end of the first side frame F1A connects the first flexible connecting element C1, the other end of it connects one end of the enlarging frame F2A1 the other end of enlarging frame F2A connects one end of second side frame F3A. Compared with the second outer frame 20B disposed outside of the second sensing module 10B, the second outer frame 20B includes a first side frame F1B, an enlarging frame F2B and a second side frame F3B; one end of the first side frame F1B connects one end of enlarging frame F2B, the other end of enlarging frame F2B connects one end of second side frame F3B, the other end of second side frame F3B connects the second flexible connecting element C2. First sensing module 10A and second sensing module 10B connect enlarging frame F2A and enlarging frame F2B through driving device 22; enlarging frame F2A and enlarging frame F2B are both made of flexible structure, the difference is: the location connecting enlarging frame F2A and driving device 22 is at outside of the line connecting first side frame F1A and second side frame F3A, yet, the location connecting enlarging frame F2B and driving device 22 is at inside of the line connecting first side frame F1B與 second side frame F3B. From this aspect, the extending direction of the second outer frame 20B in enlarging frame F2B is different from the extending direction of the first outer frame 20A in enlarging frame F2A.

Figure 6:
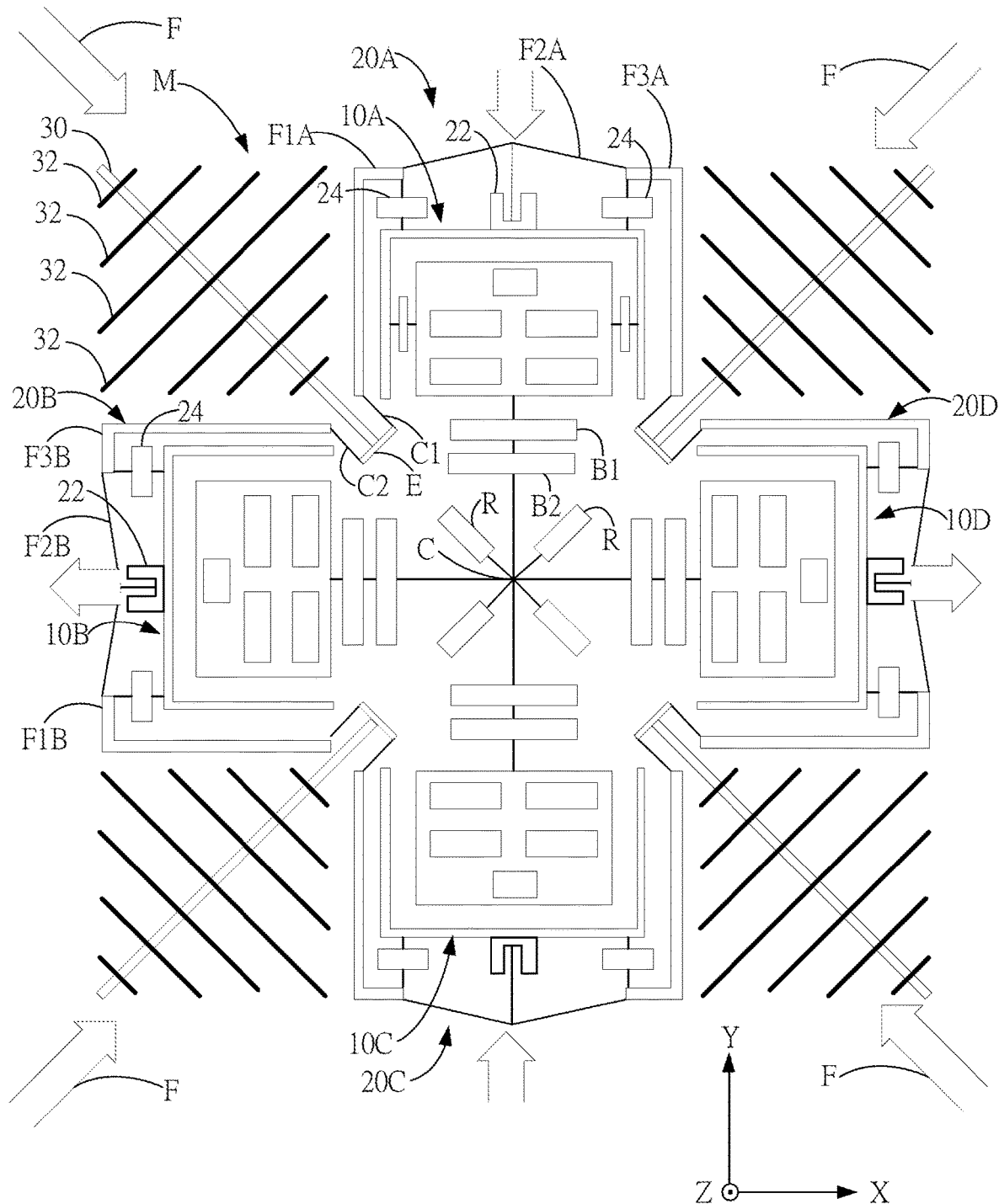
FIG. 6: which is an action schematic diagram of the microelectromechanical system gyroscope in one embodiment of the present application.

In a more specific way, as shown in FIG. 6, when the driving shaft 30 pushed inward to exert external force f, since first outer frame 20A has the flexible enlarging frame F2A, first side frame F1A and second side frame F3A may generate outward displacement toward both sides, since the connecting location of enlarging frame F2A and driving device 22 locates at outside of the line connecting first side frame F1A and second side frame F3A, it causes enlarging frame F2A forming a displacement moving toward the fixed point c along Y-axis direction, which will further increase the movement of mass block 14 in first sensing module 10A toward the fixed point c. On the contrary, although second outer frame 20B is also disposed with flexible enlarging frame F2B, making first side frame F1B and second side frame F3B able to generate outward displacement, toward both sides, but since the connecting location of enlarging frame F2B and driving device 22 locates at inside of the line connecting first side frame F1A and second side frame F3A, it causes enlarging frame F2B forming a displacement moving toward the fixed point c along X-axis direction, which will further shorten the movement of mass block 14 in first sensing module 10B toward the fixed point c. Moreover, in some embodiments, if the enlarging frame F2B itself has a large displacement away from fixed point c along the X-axis, it will make the mass block 14 of the second sensing module 10B away from fixed point c along the X-axis, so as to achieve the goal of having the first the sensing module 10A moves toward the fixed point c, meanwhile, keeping the second sensing module 10B away from the driving structure of the fixed point c.

It may be seen from the above that by providing different forms of enlarging frames, the present application may freely control the displacement of each sensing module 10 to be driven by the driving shaft 30, and enable all of the outer frames 20 moving outward or inward, it may be further divided into the first outer frame 20A and the second outer frame 20B, and the first outer frame 20A and the second outer frame 20B may be moved inward or outward respectively, which greatly increases the flexibility of microelectromechanical system gyroscope 1 in the present application.

Figure 7:
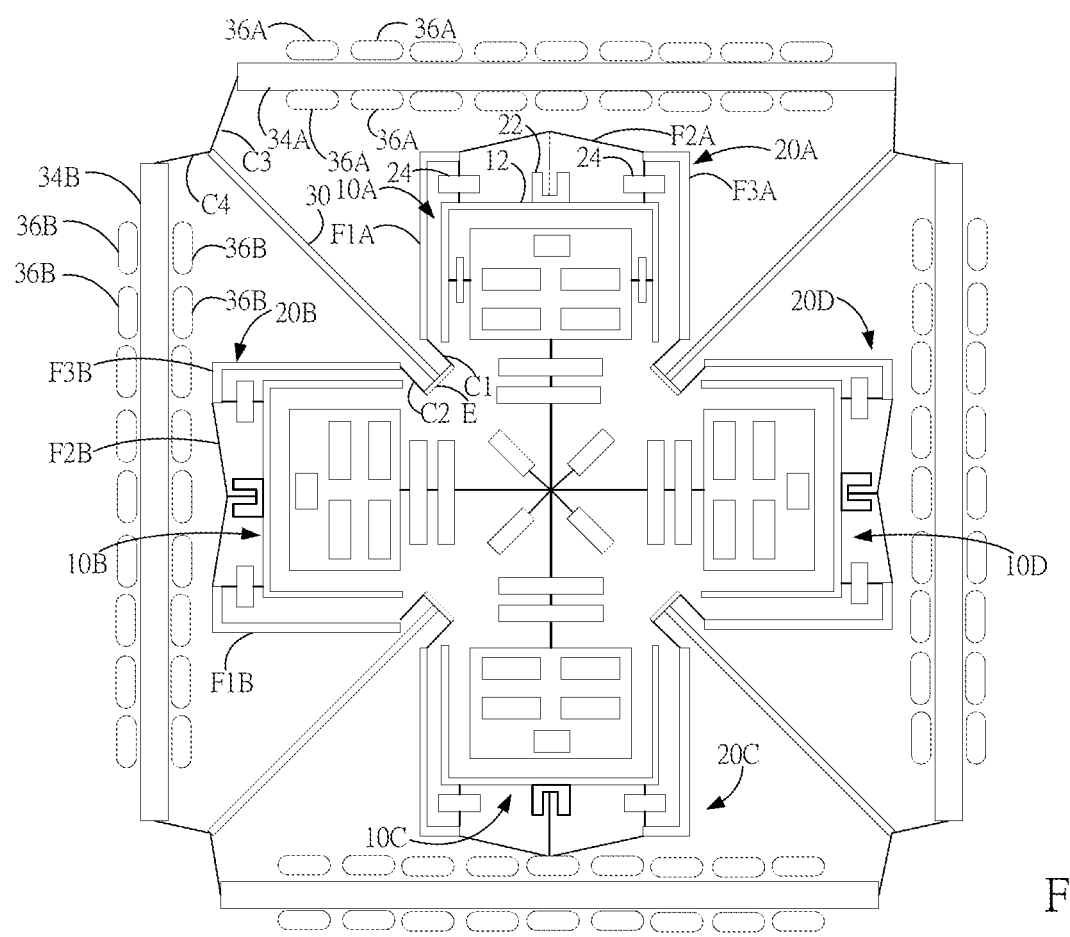
FIG. 7: which is a configuration schematic diagram of the microelectromechanical system gyroscope in another embodiment of the present application.

Referring to FIG. 7, which is the configuration schematic diagram of a microelectromechanical system gyroscope in another embodiment of the present application. Compared to the aforesaid microelectromechanical system gyroscope 1 that driving shaft 30 is driven by comb unit 32, the microelectromechanical system gyroscope 2 in the present application may divide driving shaft 30 into the first driving rod 34A and second driving rod 34B connected by third flexible connecting element c3 and fourth flexible connecting element c4, whereas first driving rod 34A and second driving rod 34B are, in respectively, disposed with plural first driver 36A and second driver 36B. The first driver 36A drive the first driving rod 34A to move along radial direction and the second driver 36B drive the second driving rod 36B to move along the radial direction to drive the driving shaft 30 moving inward or outward, and thus drives outer frame 20A, 20B. In this way, since the driver size required to drive the first driving rod 34A and second driving rod 34B in the radial direction is smaller than the comb unit 32 required to directly driving the driving shaft 30 in the radial direction, this embodiment may additionally reduce the cost of microelectromechanical system gyroscope.

In summary, the present application is a microelectromechanical system gyroscope, including plural sensing modules, the sensing modules are disposed among plural outer frames and connect the adjacent two outer frames through a first flexible connecting element and a second flexible connecting element, so that all the outer frames are connected in series to couple the external force exerted by the driving shaft or other external forces taken by the micro-electromechanical system gyroscope.

The invention claimed is:

1. A microelectromechanical system gyroscope, including:
    a plurality of sensing modules, configured for sensing angular velocities in X-axis, Y-axis and Z-axis;
    a plurality of outer frames, disposed outside of the sensing modules and each connected with each of the sensing modules through a transmission unit; and
    a plurality of driving shafts, disposed between the outer frames, each of the driving shafts connected to two adjacent outer frames through a first flexible connecting element and a second flexible connecting element;
    wherein the outer frames are pressed inward or extended outward by the driving shafts to form a reciprocating movement, and to carry two of the sensing modules performing reciprocating movements along a first axis and a second axis; the first axis is perpendicular to the second axis.

2. The microelectromechanical system gyroscope of claim 1, the sensing modules each includes:
- a driving structure, connected to the corresponded outer frame through the transmission unit;
- a mass block, located inside of the driving structure, connected to the driving structure by at least one flexible connecting element.

3. The microelectromechanical system gyroscope of claim 2, wherein, the transmission unit has more rigidity in a direction parallel to the connection between the corresponding driving structure and the corresponding outer frame; and the driving device has more flexibility in a direction perpendicular to the connection between the corresponding outer frame and the corresponding driving structure.

4. The microelectromechanical system gyroscope of claim 2, wherein, a restraint element is disposed between and connected with one of the outer frames and one of the driving structures, the restraint element has more flexibility in a direction parallel to the connection between the corresponding outer frame and the corresponding driving structure, and has more rigidity in a direction perpendicular to the corresponding outer frame and the corresponding driving structure.

5. The microelectromechanical system gyroscope of claim 2, wherein the sensing modules each further include:
- a first sensing unit, disposed on the mass block; and
- a second sensing unit, disposed on the mass block; the first sensing unit and second sensing unit sense angular velocities in different axis.

6. The microelectromechanical system gyroscope of claim 1, further includes:
- a fixed point, wherein a connector is disposed between the fixed point and each of the sensing modules, providing buffer spaces to enable the sensing modules to be driven to move relative to the fixed point.

7. The microelectromechanical system gyroscope of claim 1, wherein:
- each of the driving shafts is formed as an extending part, which extends beyond the two adjacent outer frames at both sides; the extending part is connected with the first flexible connecting element and the second flexible connecting element.

8. The microelectromechanical system gyroscope of claim 1, wherein:
- A first extending part and a second extending part are extended from two end surfaces on each of the driving shafts: a distance between the first extending part and the adjacent outer frame is different from a distance between the second extending part and the other adjacent outer frame; the first extending part is connected with the first flexible connecting element and the second extending part is connected with the second flexible connecting element.

9. The microelectromechanical system gyroscope of claim 1, wherein:
- an outer frame, including a first side frame, an enlarging frame and a second side frame; one end of the first side frame connects the first flexible connecting element, the other end connects to one end of the enlarging frame; the other end of the enlarging frame connects one end of the second side frame; one sensing module connects to the enlarging frame through a driving device.

10. The microelectromechanical system gyroscope of claim 9, wherein:
- the connecting position of the enlarging frame and the driving device is located outside of the line connecting the first side frame and the second side frame.

11. The microelectromechanical system gyroscope of claim 9, wherein:
- the connecting position of the enlarging frame and the driving device is located inside of the line connecting the first side frame and the second side frame.

12. The microelectromechanical system gyroscope of claim 1, which also includes:
- a plurality of driving rods, each connected with the driving shaft through a third flexible connecting element and a fourth flexible connecting element; each driving rod is actuated by a plurality of drivers to moves along a radial direction thereof.

* * * * *